March 6, 1962 — D. W. HUGHES — 3,023,544
EAVES TROUGH SCREEN ATTACHMENT
Filed Sept. 29, 1959 — 2 Sheets-Sheet 1
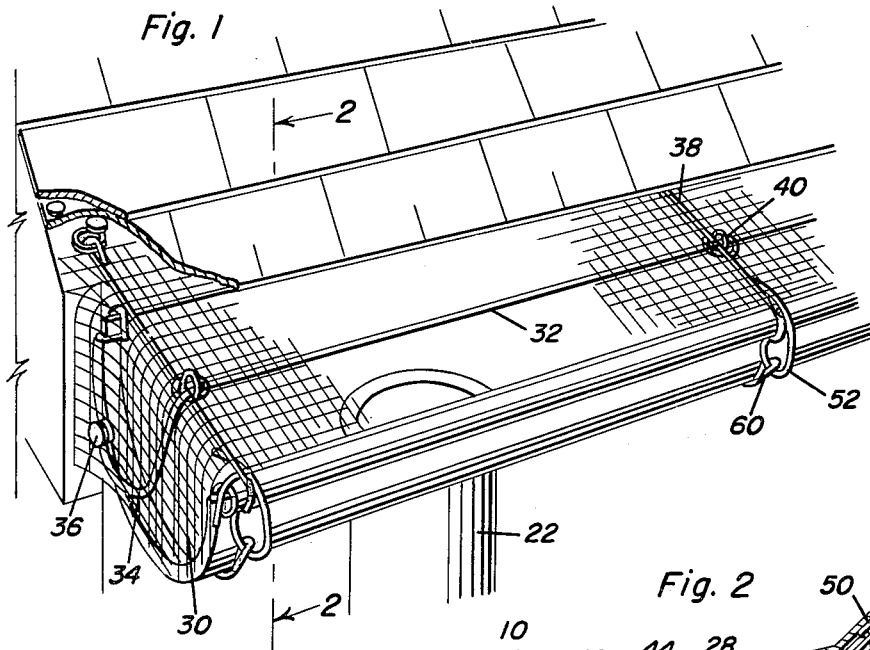
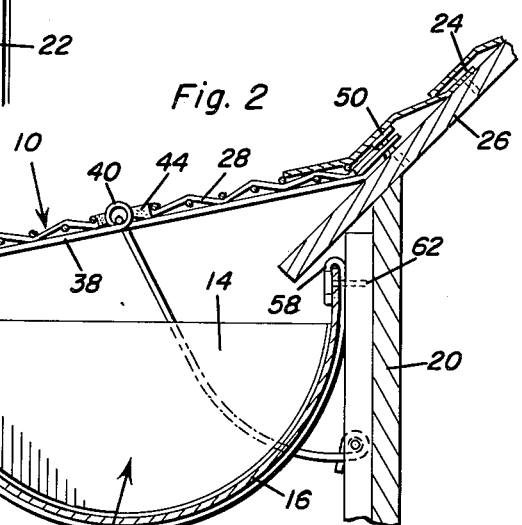
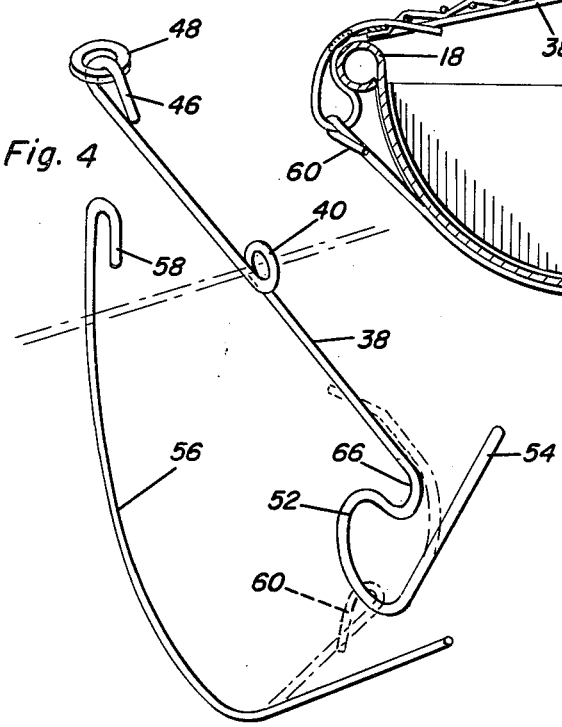
David W. Hughes
INVENTOR.

March 6, 1962  D. W. HUGHES  3,023,544
EAVES TROUGH SCREEN ATTACHMENT
Filed Sept. 29, 1959  2 Sheets-Sheet 2

David W. Hughes
INVENTOR.

BY Clarence A. O'Brien
and Harvey B. Jacobson
Attorneys

United States Patent Office 3,023,544
Patented Mar. 6, 1962

3,023,544
EAVES TROUGH SCREEN ATTACHMENT
David W. Hughes, % Da-Do Products,
R.D. 2, Susquehanna, Pa.
Filed Sept. 29, 1959, Ser. No. 843,138
3 Claims. (Cl. 50—5)

The present invention generally relates to an eaves trough screen attachment primarily intended to prevent the entry of leaves, trash or other foreign material into the eaves trough thereby enabling the eaves trough to be maintained in a clean free flowing condition.

One of the prevailing problems in eaves trough assemblies is the necessity of cleaning out the trough at periodic intervals especially if the trough is located under trees which shed leaves, limbs and the like. If the troughs are not cleaned out, they quite often become clogged and do not effectively carry out their purpose of conducting water to a downspout and consequently water will sometimes flow out of the side of the eaves trough thus defeating the purpose of the eaves trough altogether. Therefore, it is the primary object of the present invention to provide a screen attachment for eaves trough assemblies in which the screen attachment will shed the leaves or other foreign material laterally of the eaves trough but will permit water to enter the eaves trough in the usual manner.

Another feature of the present invention is to provide an eaves trough screen attachment in which the screen is provided with both longitudinal and lateral wire supporting members with the members being interconnected at their points of intersection and also including an upwardly extending projection for reception in an opening provided therefor in the screen member.

Another important object of the present invention is to provide an eaves trough attachment using the same basic structural components which may be modified slightly to fit to conventional type eaves troughs such as the semi-cylindrical or half round type or the box type eaves trough.

Still another important feature of the present invention is to provide an eaves trough screen attachment which is extremely simple in construction, easy to install, effective in operation and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the eaves trough screen attachment of the present invention installed on a gutter or eaves trough;

FIGURE 2 is a transverse, sectional view taken substantially upon a plane passing along section line 2—2 illustrating the structural features of the screen and supporting wires;

FIGURE 3 is a fragmental perspective view illustrating the manner in which the roof is formed on the outer end of the laterally supporting wires;

FIGURE 4 is an exploded group perspective view of the components of the supporting mechanism for the eaves trough;

Figure 5:
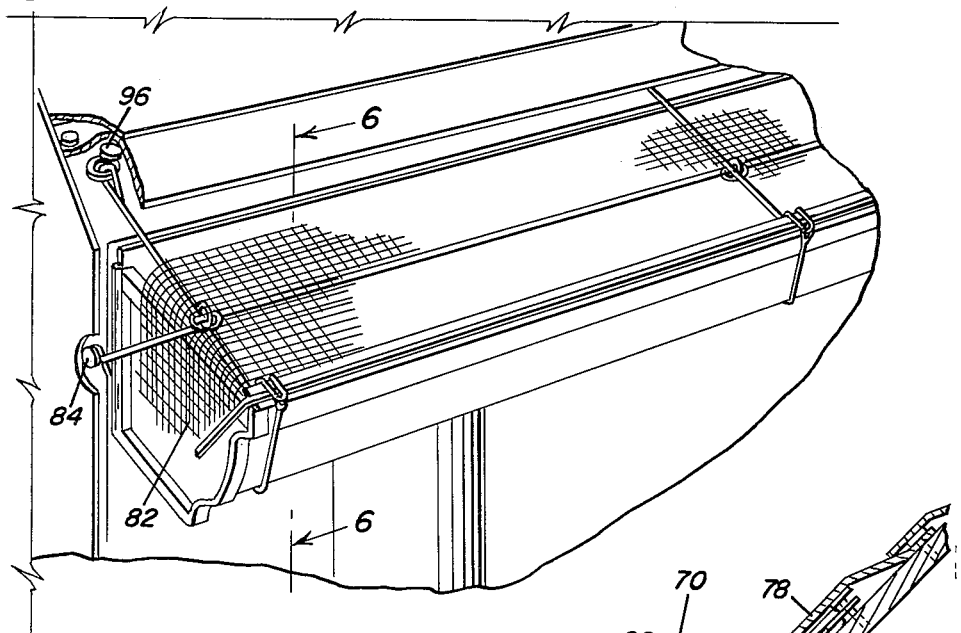
FIGURE 5 is a perspective view similar to FIGURE 1 but illustrating a modified form of invention incorporated into a box eaves trough construction.

Referring now specifically to FIGURES 1-4 of the drawings, the numeral 10 generally designates the eaves trough attachment of the present invention which is adapted to be mounted in overlying relation to the open upper end of an eaves trough or gutter generally designated by the numeral 12 and including end walls 14 and a semi-cylindrical peripheral wall 16 having the outer edge terminating in a cylindrical rolled edge 18. The eaves trough itself is of conventional construction and may be attached to the wall surface 20 in any suitable manner. Also, the eaves trough 12 may be provided with a downspout 22 whereby rain water will normally run off of the overlapping shingles 24 mounted on the roof panel 26 and being deposited into the trough 12 and subsequently discharged down the down spout 22.

The screen attachment 10 includes a longitudinally elongated wire screen member 28 of woven wire material or of any other suitable reticulated or wire mesh material. The ends of the wire screen member 28 are bent downwardly as indicated by the numeral 30 into overlying relation to the end walls 14 of the trough 16. The inner edge of the screen wire member 28 is disposed in underlying relation to the lowermost shingle 24 and engages the roof panel 26. The outer edge of the screen wire member 28 is engaged with the outer cylindrical edge 18 of the trough.

Underlying the wire screen member 28 is an elongated longitudinally extending supporting wire 32 which is disposed centrally of the wire screen member 28 and has the ends thereof downturned as designated by the numeral 34 for subsequent anchoring to the wall by a suitable driven fastener 36 which not only holds the wire to the supporting surface but also retains the wire screen mesh closer to the surface of the trough.

Underlying the wire screen member 28 is a plurality of laterally extending supporting wires 38 having an upstanding loop 40 disposed centrally thereof which loop 40 extends around the longitudinal supporting wire member 32 and also extends into an opening 44 formed in the screen wire member 10.

The inner end of the supporting wire 38 is provided with a reverse bend loop 46 receiving an annular washer 48 thereon which washer is used for anchoring the supporting wire members 38 by virtue of a driven fastener which extends through the eye member 48 into the roof panel 26.

The other end of the lateral supporting wire 38 is provided with an enlarged reverse bend loop 52 having the free end portion 54 adapted to be latched under the wire supporting member 38 thereby maintaining generally the size of the trough. An elongated wire member 56 having a hook 58 at one end is engaged with the loop 22 by virtue of the twist loop 60 formed in the end thereof remote from the hook 58 so that the hook 58 may engage over the rear or inner side edge of the trough wall 16 and a single fastener such as a nail 62 may be employed for this purpose. The end portion of the loop 54 which is bent back over the wire member 38 for a portion of its distance may be secured thereto as by soldering, welding or the like designated by the numeral 64 for rigidifying the entire device and supporting the assembly in the desired position.

The loop 52 defines a notch 66 which partially snaps over the cylindrical rounded edge 18 of the gutter trough 12. The entire assembly is extremely easy to arrange and orientate and the end 54 of the loop 52 extending through the wire mesh screen 28 as illustrated in FIGURE 2 will retain the screen in position with the other edge of the screen being disposed in underlying relation to the roof shingles thereby retaining the entire device in position in overlying relation to the trough.

Figure 6:
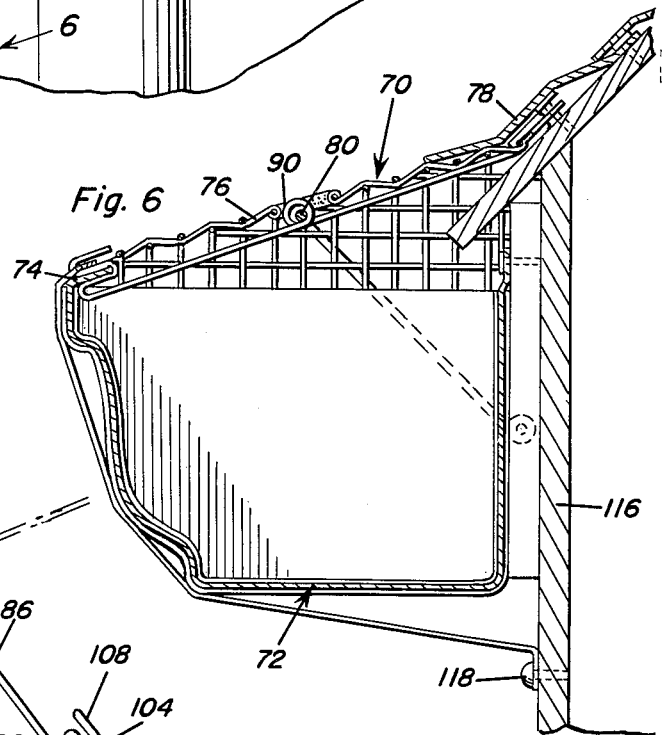
FIGURE 6 is a transverse, vertical sectional view taken substantially upon a plane passing along section line 6—6 of FIGURE 5 illustrating the structural details of this form of the invention.
Figure 7:
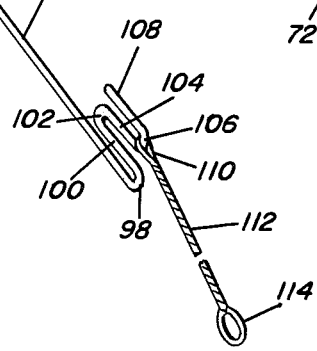
FIGURE 7 is a perspective view of the lateral wire support employed in the construction of FIGURE 5.

Referring now specifically to FIGURES 5–7, the numeral 70 generally illustrates another form of the eaves trough attachment for box type gutters generally designated by the numeral 72 which include an inturned outer edge 74. The screen attachment includes an elongated screen wire member 76 similar to the screen wire member 28 in the form of the invention illustrated in FIGURES 1–4 and the inner edge thereof underlies the lowermost shingle 78 and the outer edge thereof lies against the top surface of the inturned flange 74. A longitudinal wire supporting member 80 is provided in underlying relation to the wire screen and extends through the wire screen at the downturned portion 82 thereof and extends along the outer surface thereof and is secured to the wall surface by a fastener 84. A plurality of lateral wire supporting members 86 are provided in underlying relation to the screen wire member 76 and are provided with upwardly projecting loops 88 receiving the longitudinal supporting wire 80 and projecting through apertures 90 in the screen wire member. The inner end of the supporting wire 86 is provided with a loop 92 receiving a washer or ring member 94 which is attached to the roof panel by fastening members such as a nail 96. The outer end of the supporting wire 86 is provided with a reverse bend 98 having an upper run 100 underlying the flange with the upper end terminating in a reverse bend 102 having an upper run 104 engaging the upper surface of the flange 74 thereby locking the outer end of the support wire 86 to the gutter. The outer end of the upper run 104 is provided with a reverse bend 106 having an upper run 108 parallel with the upper run 104. This construction forms an outwardly opening notch and an inwardly opening notch with the outwardly opening notch receiving the flange 74. The inwardly opening notch receives the outer edge of the screen member 76 for retaining the screen member in position. The inwardly opening notch also receives the looped end 110 of a twisted anchor wire supporting member 112 having a loop 114 on the other end thereof which is attached to the wall surface 116 by a fastener 118 with this fastener being disposed beneath the gutter or eaves trough as illustrated in FIGURE 6.

In both forms of the invention, both lateral and longitudinal support is provided for the screen wire member for preventing the screen wire member from bending down into the gutter trough and there is also provided positive interlocking engagement between the wire supporting member and the screen wire member for anchoring the screen wire member in position and preventing relative movement thereof. In the event the screen wire member is to be used in a trough having an inside corner arrangement, it is only necessary to extend the extension 32 under the adjacent roof panels which are disposed in perpendicular relation to the screen wire member. The intersecting screen wire member will have the extending portion 82 or 30 projected under the corresponding roof shingle of panels on the perpendicularly arranged surface thereby providing an overlapping corner joint for the screen wire members for the entire length of the trough. The entire device may be constructed for distribution in a kit form so that persons ordinarily skilled may employ the assembly for providing their eaves troughs with protective screens.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. An eaves trough screen attachment comprising an elongated wire screen member adapted to overlie an eaves trough with one edge disposed adjacent a roof structure and the other edge disposed adjacent the outer edge of the trough, an elongated supporting wire extending centrally and longitudinally along the inner surface of the wire screen member, the ends of said longitudinal supporting wire extending downwardly and inwardly alongside the ends of the eaves trough and terminating in a loop adapted to be attached to a building wall inwardly of the trough thereby supporting the wire screen member, a plurality of lateral supporting wires extending under the wire screen member and having one end adapted to be connected with a roof structure and the other end adapted to engage the outer edge of the trough and engaged with the outer edge of the wire screen member, means interconnecting the longitudinal and lateral supporting wires at their points of intersection, and an anchor wire connected to the outer ends of each lateral supporting wire and adapted to extend under the trough and anchored to a building wall inwardly of the trough, said means interconnecting the longitudinal and lateral supporting wires including an upstanding loop on each of the lateral supporting wires, said loops receiving the longitudinal supporting wire thereby supporting the longitudinal wire, said screen member being provided with a plurality of apertures for receiving the upstanding loops thereby locating the screen member in relation to the supporting wires, the outer end of each lateral supporting wire being provided with means detachably connecting the end of the lateral wire with the outer edge of the wire screen member, and means on the outer end of each lateral supporting wire for detachable engagement with the outer edge of the trough.

2. The combination of claim 1 wherein said means for engaging the trough includes an outwardly facing notch receiving an inturned flange on a box-type trough, said means for engagement with the wire screen member including an inwardly opening notch on the lateral supporting wire for receiving the edge of the screen wire.

3. The combination of claim 1 wherein said means engaging the trough includes an inwardly facing rounded notch for receiving the rounded upper edge of a semi-cylindrical trough, said means engaging the wire screen member including a bendable end on the lateral supporting wire, said bendable end being reversely bent and overlying the screen wire and projecting downwardly therethrough, said bendable end also serving to connect the lateral supporting wire to the anchor wire.

References Cited in the file of this patent

UNITED STATES PATENTS

| | | |
|---|---|---|
| 608,844 | Dick | Aug. 9, 1898 |
| 706,333 | Meuser | Aug. 5, 1902 |
| 1,732,058 | Martini | Oct. 15, 1929 |
| 2,219,953 | Fry | Oct. 29, 1940 |
| 2,365,845 | Schweda | Dec. 26, 1944 |